United States Patent
Kozdon et al.

(10) Patent No.: US 6,937,724 B1
(45) Date of Patent: Aug. 30, 2005

(54) APPARATUS AND METHOD FOR DELIVERY OF RINGING AND VOICE CALLS THROUGH A WORKSTATION

(75) Inventors: Peter Kozdon, Santa Clara, CA (US); Mark Skrzynski, Capitola, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/280,256

(22) Filed: Mar. 29, 1999

(51) Int. Cl.[7] .............................................. H04M 1/00
(52) U.S. Cl. .......................... 379/420.01; 379/201.04; 379/110.01; 379/388.01; 379/373.01; 381/123
(58) Field of Search .................... 379/68, 900, 420.01, 379/420.04, 265.01, 265.02, 388.01, 373.01, 379/375.01, 88.13, 420.02, 420.03, 110.01; 381/123, 74

(56) References Cited

U.S. PATENT DOCUMENTS

| | | | | |
|---|---|---|---|---|
| 4,491,694 A | * | 1/1985 | Harmeyer ................... | 379/442 |
| 5,283,638 A | * | 2/1994 | Engberg et al. ............... | 348/14 |
| 5,471,470 A | * | 11/1995 | Sharma et al. .............. | 370/271 |
| 5,774,567 A | * | 6/1998 | Heyl ........................... | 341/141 |
| 5,790,781 A | * | 8/1998 | Cox et al. ..................... | 714/47 |
| 5,822,406 A | * | 10/1998 | Brown ..................... | 379/88.07 |
| 5,913,062 A | * | 6/1999 | Vrvilo et al. ............... | 709/321 |
| 6,041,295 A | * | 3/2000 | Hinderks .................... | 704/206 |
| 6,104,819 A | * | 8/2000 | Nickum ..................... | 381/123 |
| 6,169,734 B1 | * | 1/2001 | Wilson ...................... | 370/352 |
| 6,282,269 B1 | * | 8/2001 | Bowater et al. ......... | 379/88.17 |
| 6,501,836 B1 | * | 12/2002 | Tran et al. ............. | 379/110.01 |

FOREIGN PATENT DOCUMENTS

| | | | | |
|---|---|---|---|---|
| GB | 2 338 863 | 12/1999 | ........... | H04M 1/00 |
| WO | WO 92/03884 | 3/1992 | .......... | H04M 11/00 |
| WO | WO 97/07597 | 2/1997 | ............ | H04B 1/00 |

* cited by examiner

*Primary Examiner*—Fan Tsang
*Assistant Examiner*—Simon Sing

(57) ABSTRACT

A data processing system comprises an audio processing means receiving data within said data processing system for converting the data into an analog signal with a first and a second analog channel components; an audio output means receiving the analog signal and providing a first and second output signal wherein the first output signal is provided for a loudspeaker and the output second signal is provided for a headset. The control of the audio processing means by a control signal providing an audio signal on the first or on the second channel or on both.

18 Claims, 2 Drawing Sheets

APPARATUS AND METHOD FOR DELIVERY OF RINGING AND VOICE CALLS THROUGH A WORKSTATION

BACKGROUND OF THE INVENTION

Data processing devices such as workstations or personal computers are or can be equipped with an audio card to provide audio input and output functions. Modern multi-media systems use such audio cards to support telephony services using a modem or a network connection rather than the traditional telephone network. Telephony functions using a modem can be either regular "analog"-telephone functions provided by a so-called voice modem, or telephony over data network using a modem or a network interface card to couple to data-networks, such as the Internet.

Today's multi-media workstations or personal computers (PC) support a wide variety of different complementary products to enhance these functions, such as loudspeakers, head-sets with microphones, etc. Nevertheless, in many environments, such as offices, it is often required to use a speaker for alerting (ringing the phone) and after connecting either a speaker phone mode for convenience or a handset to provide privacy of a phone call. As usual multi-media system providing telephone functions only use standard audio cards with a single (common) audio output, the user can either use speakers or a headset in the telephone environment. To select between either a headset and a loudspeaker an external switch-box is required. The user must remember to switch back to the speaker mode after the end of the call, to ensure that he can hear the ringing of the next call, depending on the relative sensitivities of the speaker and headset, a change of the volume setting may also be required.

SUMMARY OF THE INVENTION

Therefore, it is an object of the present invention to provide an improved audio input and output means for a data processing system with the capability of addressing either or both a headset or a loudspeaker. This object is achieved by a data processing system comprising an audio processing means receiving data within said data processing system for converting the data into an analog stereo signal with a first and a second analog channel; an audio output means receiving the analog stereo signal and providing a first and second output signal wherein the first output signal is provided for a loudspeaker and the output second signal is provided for a headset; the audio processing means upon a control signal either provide an audio signal on the first or on the second channel. This method still uses the usual audio soundcards found in most workstations or PC's.

Furthermore, a method provides the steps of: receiving a digital signal representing an audio signal; receiving a control signal; processing the digital signal to generate a two channel signal and upon the control signal providing the signal for either or both a first or a second audio channel, wherein the first signal is provided for a loudspeaker and the second signal is provided for a headset; converting said first and second signals into analog signals.

Upon receiving a ringing signal which can be presented to both the speaker and the headset or only to the speaker, the method allows the user to select either the headset or the loudspeaker as an output medium. The control signal can be generated by a keyboard, a mouse, a trackball or any other input device.

The method allows for independent setting of the output level (volume) for both the speaker and headset, there is no danger of the user being subjected to excessive sound level, when switching between the headset and speaker, or should the connection be left in the wrong state after the completion of a call (loud ringing through headset—or missing the call because the volume is to low).

DESCRIPTION OF THE PREFERRED EMBODIMENT

Figure 1:
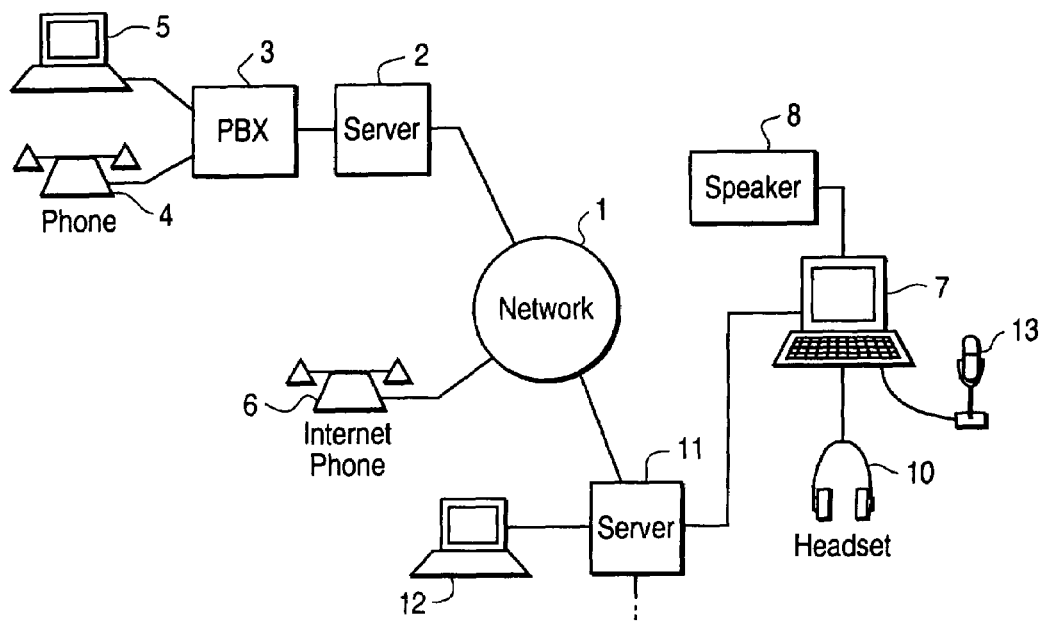
FIG. 1 shows a multi-media system according to the present invention.

FIG. 1 shows a network 1, such as the Internet, coupled with a variety of I/O devices. For example, a server 2 is coupled with a private branch exchange 3 (PBX) which can connect to a plurality of workstations 5 or telephone sets 4. Also, an internet phone 6 can be directly coupled with the internet. More workstations 7, 12 can be coupled with the internet through a server 11 with the network 1. Each workstation 7 may be a multi-media personal computer 7 with a respective sound card (not shown), speakers 8, a headset 10, and a microphone 13.

If a telephone call is made from one of the telephone sets 4, 6 or workstations 5, 12 to workstation 7 using a packetized voice data stream, a ringing signal will be sent to workstation 7. According to the present invention, the ringing will be output to the speaker 8. In addition, the ring may be also applied to the headset. Together with the ringing a message may pop up on the screen of the workstation 7 asking the user to choose between a speakerphone function or a headset function. Instead, the user could also activate a predefined keyboard action, mouse click, etc. This could be known to the user and done without the screen pop-up menus. In case the user decides to use the speakerphone function the headset will be disabled and the incoming audio data will be directed to the loudspeaker 8. In case the headset function is chosen, the loudspeaker 8 will be disabled and audio signals will be forwarded to the headset 10. In both scenarios microphone 13 may be used as the input medium. If there are multiple audio inputs on the soundcard, it would be possible to use separate mic's for headset, speakerphone. This is an implementation choice, the selection of the desired microphone or the activating of the microphone could be tied to the selection of the desired audio device.

Figure 2:
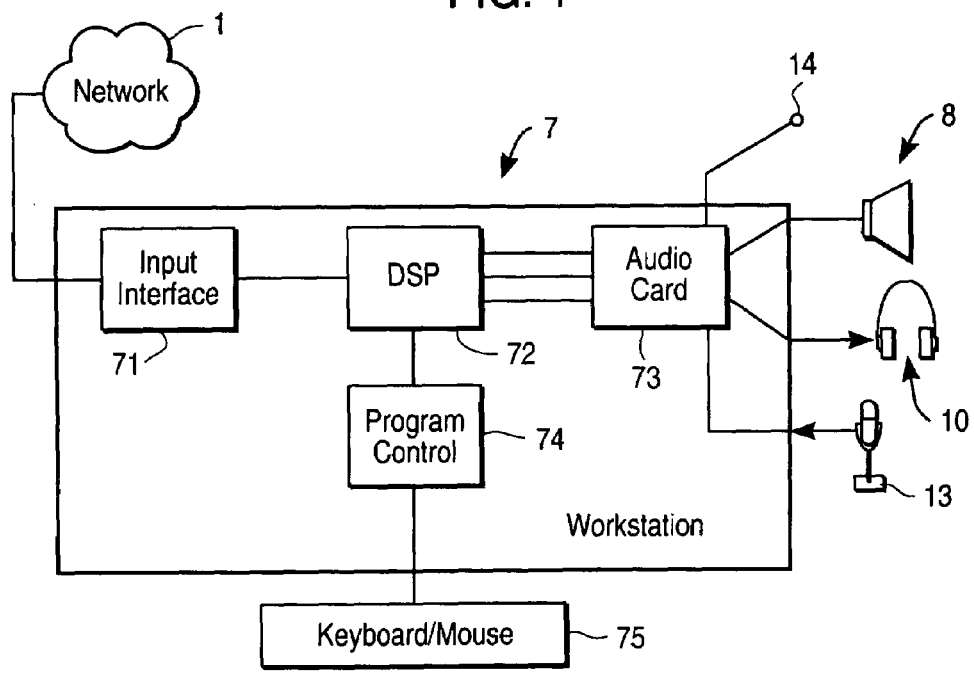
FIG. 2 shows details of a multi-media system according to FIG. 1.

FIG. 2 shows details of the audio system within a multi-media workstation 7 according to FIG. 1. Workstation 7 comprises an input interface 71 which couples workstation 7 with network 1. Input interface 71 is coupled with a digital signal processor (DSP) 72 which processes the packetized incoming data stream into a stereo audio signal and processes any audio signal from microphone 13 received through an A/D converter in audio card 73 into a packetized data stream which can be transferred over network 1. A program control unit 74, such as the central processing unit, receives data from a keyboard or mouse or any other input device and feeds a respective control signal to DSP 72. DSP 72 generates a left and a right audio signal which is fed to an audio card 73. Audio card 73 comprises D/A and A/D converter and respective amplifier stages to drive loudspeaker 8 and/or headset 10. The audio card may also have additional input/outputs 14, for example, for a second set of loudspeakers and/or additional microphones.

In the embodiment shown in FIG. 2, DSP 72 manages incoming and outgoing data streams under the control of program control unit 74. In this embodiment only one speaker 8 is used which is coupled to either the right or left output of audio card 73. The other output of audio card 73 is connected to headset 10. In case of an incoming call DSP 72 generates a ringing signal which is fed to the audio channel coupled with loudspeaker 8. In another embodiment the ringing signal can be applied to both loudspeaker 8 and headset 10 with appropriate volume settings for each of the outputs. On the screen of workstation 7 an Alert-Box will be generated as for example shown in FIG. 5. Such an Alert-Box indicates in addition to the ringing signal that an incoming call is waiting to be picked up. The user can, for example in a window-based graphical user interface, move an arrow 104 to select one of three choices. The selection is done by clicking on a respective button or icon 101, 102, or 103. Clicking on button 101 selects a speaker phone function. In this mode all incoming audio data are processed by DSP 72 into a single digital audio signal which will be converted into an analog audio signal by means of audio card 73. This single analog signal is then fed to speaker 8. Clicking on button 102 selects the headset mode. In this mode DSP 72 generates the audio signal on the other audio channel which will be converted into a single audio signal by means of audio card 73 and fed to headset 10. Clicking on button 103 cancels the incoming call.

Another embodiment could additionally allow for the sending of the audio outputs to both the speaker as well as the headset, for instance, for someone who is hard of hearing an needs higher volume.

Figure 3:
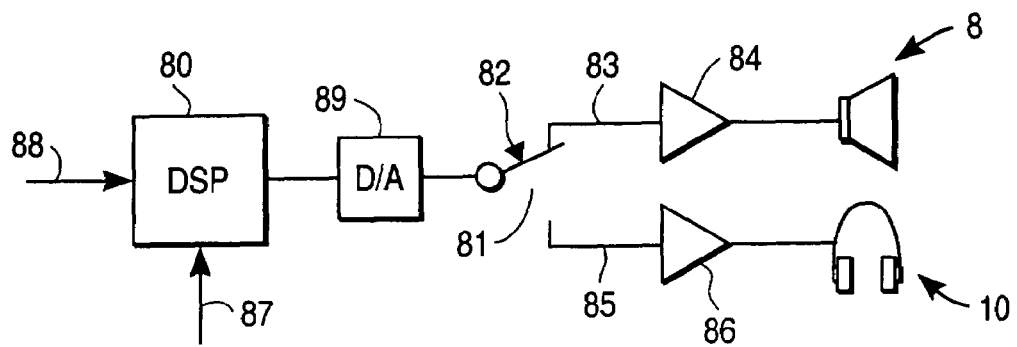
FIG. 3 shows details of the audio system according to a second embodiment.

Another embodiment of an audio subsystem according to the present invention is shown in FIG. 3. Again, a DSP 80 is provided which processes a digital data stream 88, for example packetized audio data. DSP 80 is under control of a control signal 87, for example, provided by a central processing unit of a workstation. DSP 80 generates a single audio signal which is converted into an analog signal by means of D/A converter 89. The analog signal is fed to a switch 81 which operates under control of a control signal 82. Switch 81 feeds the analog signal either to line 83 which connects to the input of amplifier stage 84 or to line 85 which connects to the input of amplifier stage 86. Output of amplifier stage 84 is coupled with loudspeaker 8 and output of amplifier stage 86 is coupled with headset 10.

Figure 5:
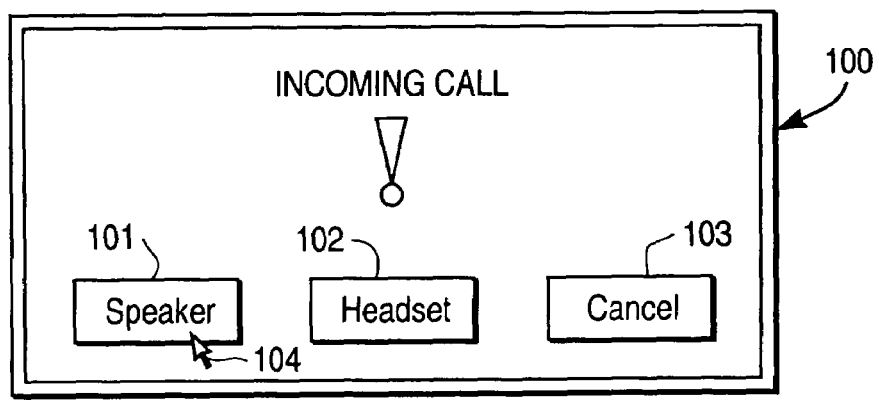
FIG. 5 shows a Alert-Box which can be displayed on a multi-media system according to the present invention.

In this embodiment only a single audio signal is generated. In case of an incoming call switch 81 couples the output of D/A-converter 89 with the input of amplifier stage 84 so that the ringing signal will be fed to the loudspeaker 8. According to the selection made by the user, as shown in FIG. 5, switch 81 couples either loudspeaker 8 or headset 10 with the respective audio signal.

Figure 4:
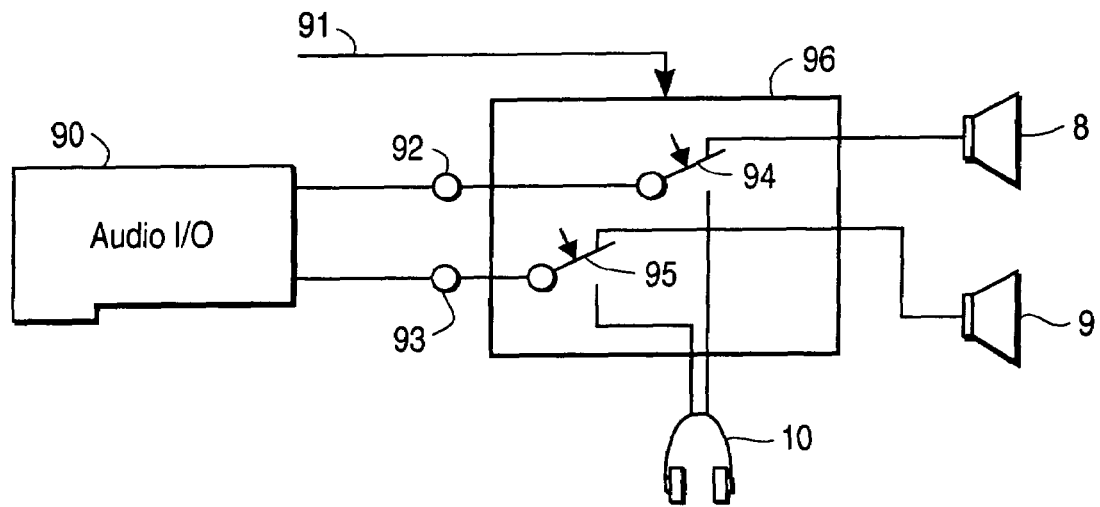
FIG. 4 shows details of the audio system according to a third embodiment.

FIG. 4 shows a third embodiment which can be implemented in existing systems, for example, as an automatic external switch box. In this case a standard audio I/O card 90 is used within a personal computer. Audio I/O card 90 generates a stereo analog output signal which is fed to terminals 92 and 93. External switch box 96 comprises two switches 94 and 95. Switches 94 and 95 are controlled by a control signal 91. Control signal 91 can be provided by audio I/O card 90, or by a parallel or a serial output port, or any other suitable port of the respective workstation. Switches 94 and 95 either couple loudspeakers 8, 9 or headset 10 with terminals 92 and 93, respectively.

In an other embodiment one output could be taken to a recording device and the other to a speaker or headset. The selection of the recorder output made using the screen, keyboard, mouse, etc.

In all cases the system will revert to a known state at the end of the call, ready to process the next incoming call Thus, the ringing signal cannot be missed by the user in case he does not wear the headset nor is there any danger of the user being exposed to excessive sound level, if he does not switchback prior to the next call. Implementation choices may also allow the user to switch between the speaker and headset modes at any time during the actual call. Upon selection, as described above in combination with FIG. 5, either the loudspeakers 8, 9 or the headset 10 is used as an output device.

What is claimed is:

1. A computer system comprising:
    an audio processing means receiving data within said computer system for processing digital audio signals into digital audio signals with a left channel a and right channel;
    a sound system for providing stereo sound with a left and a right stereo output signal within said computer system receiving said digital audio signals; and
    a display, upon detecting a call providing a visual graphical image suitable including icons for receipt of a control signal, wherein one of said stereo output signals is provided for a loudspeaker and the other of said stereo output signals is provided for a headset; said audio processing means upon receiving said control signal providing an audio signal either on said left or on said right channel, wherein a providing of an audio signal to only one of said left or right channel corresponds to a providing of an audio signal to only a corresponding one of said loudspeaker or said headset.

2. A computer system according to claim 1, wherein said computer system is coupled with a data network and said receiving data are packetized audio data.

3. A computer system according to claim 1, wherein said computer system is coupled with a telephony network and said receiving data are telephony (analog or digital) audio data.

4. A computer system according to claim 1, wherein said system is a telephony over network system.

5. A computer system according to claim 1, wherein said control signal is generated by a manual input device coupled with said computer system.

6. Method for providing audio signals within a data processing system comprising the steps of:
    receiving a digital signal representing an audio signal;
    presenting, upon detecting a call, a visual graphical image including icons suitable for receipt of a control signal;
    receiving a control signal;
    processing said digital signal to generate a stereo signal having a left and right stereo audio channels and upon receiving said control signal providing said audio signal for either a left or right stereo audio channel, wherein one of said stereo channels is provided for a loudspeaker and not for a headset and the other one of said stereo channels is provided for said headset and not said loudspeaker, whereby selection is effected between said loudspeaker and said headset; and
    converting said stereo signal into analog signals.

7. Method according to claim 6, wherein said digital signal is provided by a telephony over network system and said control signal is received after a ringing signal is detected.

8. Method according to claim 7, wherein the ringing signal is output on both audio channels.

9. Method according to claim 7, wherein the ringing signal is output on one audio channel.

10. Method for providing audio signals within a data processing system having a stereo audio output system with a left and a right channel, wherein one channel is coupled with a loudspeaker and the other channel is coupled with a headset, the method comprising the steps of:
- receiving a digital signal representing an audio signal provided by a telephony over network system;
- receiving a ringing signal;
- generating a ringing sound on at least one of said channels of the stereo output system, wherein said one channel is the channel coupled with the loudspeaker;
- presenting, upon detecting said ringing signal, a visual graphical image including icons suitable for receipt of a control signal;
- receiving said control signal;
- processing said digital signal to generate a stereo signal and upon receiving said control signal providing said audio signal for either a left or right stereo audio channel;
- converting said stereo signal into analog signals; and
- providing said stereo signal to said stereo audio output system.

11. Method according to claim 10, wherein said ringing sound is generated with a pre-defined volume.

12. Method according to claim 10, wherein said ringing sound is generated for both channels of said stereo output system, wherein each channel comprises a pre-defined volume.

13. Method according to claim 10, generating said ringing sound on at least one of said channels of the stereo output system independent from the selected audio channel.

14. Computer system according to claim 1, wherein audio signal provided to either said left or right channel would is from a same audio source.

15. Method according to claim 1, wherein audio signal provided to either said left or right channel would is from a same audio source.

16. A computer system according to claim 1, wherein said visual graphical image includes a plurality of icons, each of said plurality of icons representing at least one of a speaker selection, a headset selection or a cancel selection.

17. Method according to claim 6, wherein said visual graphical image includes a plurality of icons, each of said plurality of icons representing at least one of a speaker selection, a headset selection or a cancel selection.

18. Method according to claim 10, wherein said visual graphical image includes a plurality of icons, each of said plurality of icons representing at least one of a speaker selection, a headset selection or a cancel selection.

* * * * *